2 Sheets—Sheet 1

S. J. & N. T. WILSON.

MILK COOLER.

No. 10,496. Reissued July 1, 1884.

Attest.
M. F. Sprague
E. Scully

Inventors
Samuel J. Wilson
Nahum T. Wilson
By Wm. A. Magney Att'y.

N. PETERS. Photo-Lithographer, Washington, D. C.

2 Sheets—Sheet 2.

S. J. & N. T. WILSON.

MILK COOLER.

No. 10,496. Reissued July 1, 1884.

Attest:
M. P. Sprague
E. Scully

Inventors.
Samuel J. Wilson.
Nahum T. Wilson
By Thos. S. Sprague Atty.

N. PETERS, Photo-Lithographer, Washington, D. C.

UNITED STATES PATENT OFFICE.

SAMUEL J. WILSON AND NAHUM T. WILSON, OF ROGERSVILLE, MICHIGAN.

MILK-COOLER.

SPECIFICATION forming part of Reissued Letters Patent No. 10,496, dated July 1, 1884.

Original No. 273,659, dated March 6, 1883. Application for reissue filed June 21, 1883.

*To all whom it may concern:*

Be it known that we, SAMUEL J. WILSON and NAHUM T. WILSON, of Rogersville, in the county of Genesee and State of Michigan, have invented certain new and useful Improvements in Milk-Coolers; and we do hereby declare that the following is a full, clear, and exact description of the invention, which will enable others skilled in the art to which it appertains to make and use the same, reference being had to the accompanying drawings, which form a part of this specification, and in which—

Figure 1:
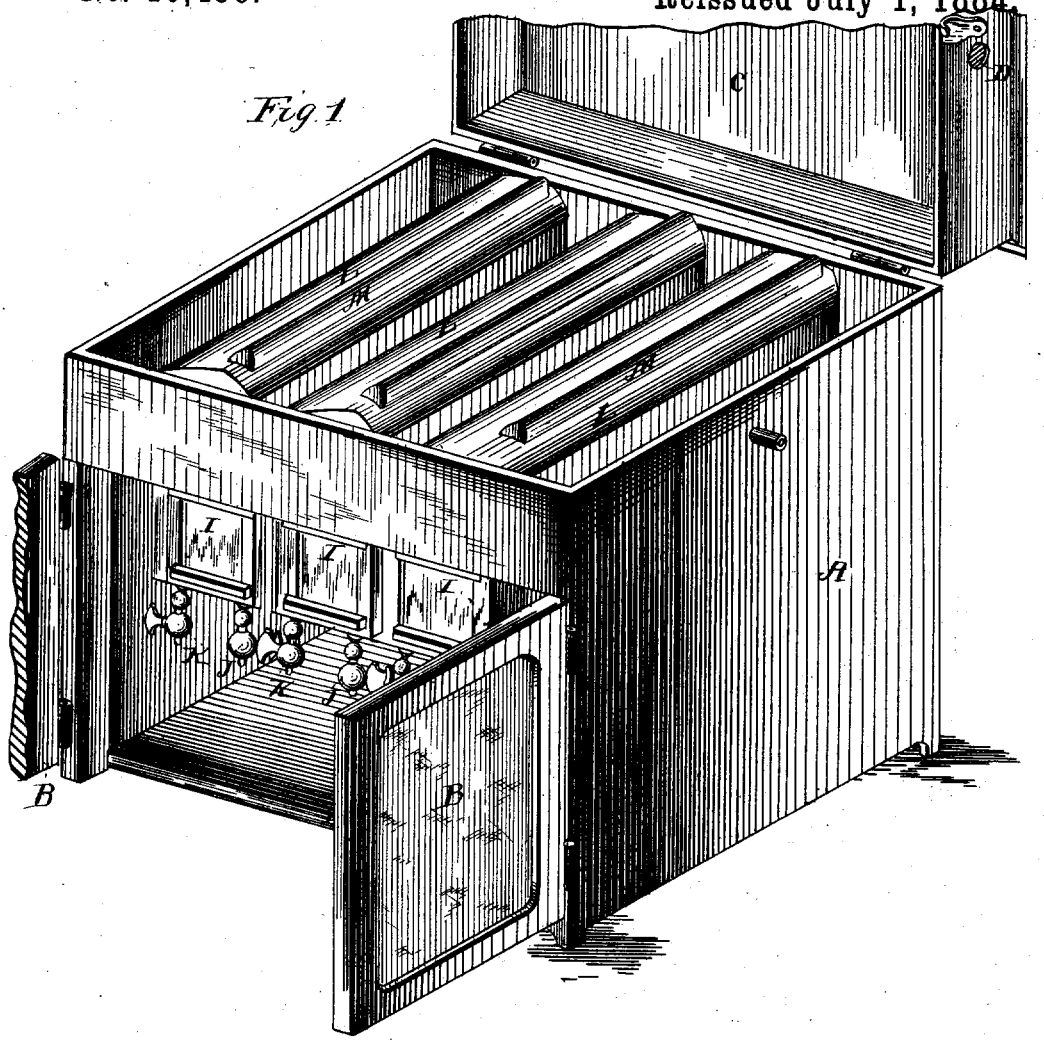
Figure 4:
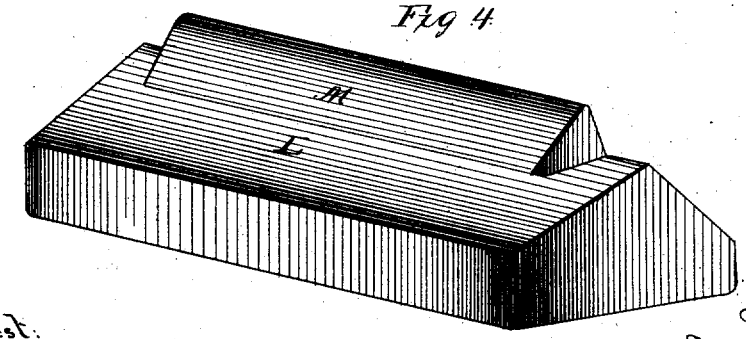
Figure 2:
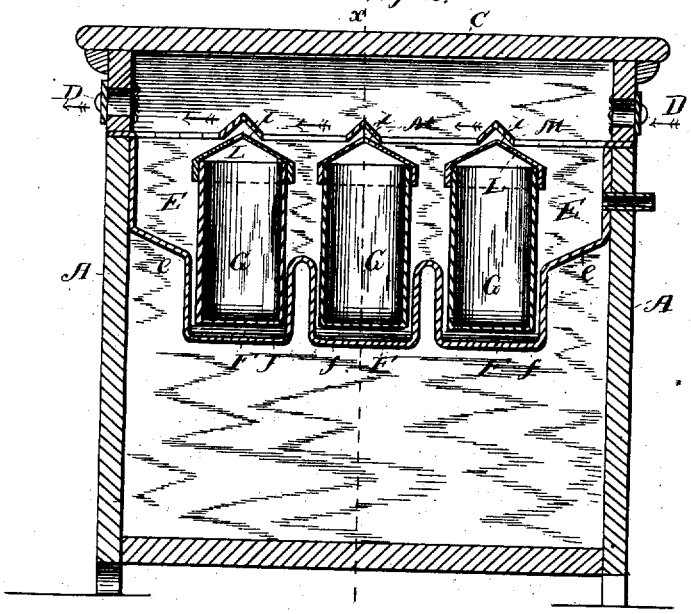
Figure 3:
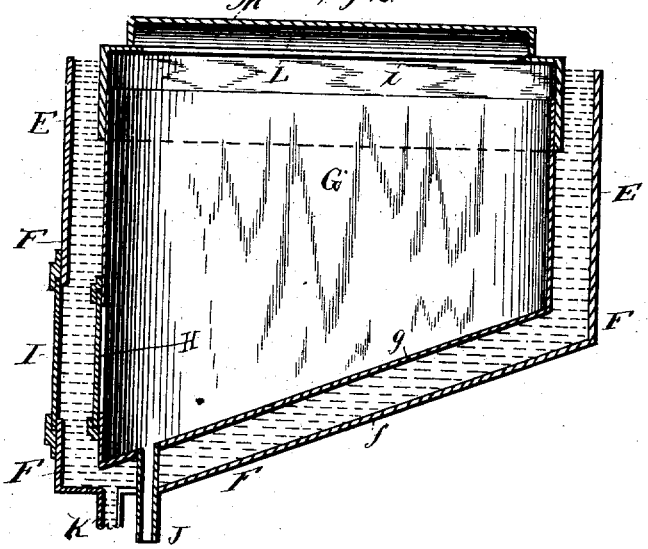

Figure 1 is a perspective view of a cabinet containing a set or series of our improved milk-coolers or creaming-cans, showing the doors and lid or cover open. Fig. 2 is a longitudinal vertical section through the cabinet, with its sinks and creaming-cans. Fig. 3 is a longitudinal sectional view through one of the cans, with the tank and its appropriate well, on the line *x x* in Fig. 2, and taken at right angles to the sectional view represented in Fig 2; and Fig. 4 is a perspective view of the cover of the creaming-can detached.

Similar letters of reference indicate corresponding parts in all the figures.

Our invention has relation to milk-coolers, or so-called "creaming-cans" for raising cream from milk; and it consists in the improved construction of the milk-containing vessel, and in its combination with a refrigerating-cabinet having a tank with peculiarly-constructed "wells," substantially as hereinafter more fully described and claimed.

In the accompanying two sheets of drawings, A represents the outside casing or cabinet, which is made of wood and adapted to contain any desired number of cans.

In the present illustration of our invention we have shown a cabinet containing a set of three cans; but it may contain a larger or smaller number, and as many as a dozen cans, and even more, if desired, may be arranged within a single cabinet, according to the capacity of the dairy in which it is used. This cabinet has doors B B and a hinged cover, C, provided at opposite ends with ventilating-apertures D D, covered by wire-gauze and having sliding doors. In the upper part of the cabinet is a tank or sink, E, of zinc, galvanized iron, or other suitable material, which has a series of wells, F, corresponding in number and arrangement to the number of cans G. By reference to Fig. 2 it will be seen that the tank or sink E slopes at its bottom *e e* into the wells F, while by reference to Fig. 3 it will be observed that the bottoms of the wells also slope downward and frontward, forming inclined bottoms *f*. The portions *e e* of the bottom of the sink E, which we will designate as "connecting" portions, are constructed integrally with the metal sheet of which the wells are formed, and this metal sheet is bent upon itself to form double walls between the adjacent wells, as shown. The double walls are not only a convenience in the manufacture when formed of one piece of metal, but they form spaces to keep the cans a proper distance from each other, so that the cans will not touch, and will leave space for the covers which project over the sides of the cans. Besides this, they form additional cooling-surfaces to keep the air cool in the space below the tank, which space can be utilized for cooling purposes.

The cans G, which are all alike and of even size, are made very narrow—say about five inches in width—in proportion to their length and depth, and have rounded corners, to facilitate their thorough cleansing, and a bottom, *g*, forming an inclined plane from rear to front, corresponding to the well-bottoms *f*, as shown in Fig. 3, in which position the two are supported by any well-known means; but as such means forms no part of this invention, it is unnecessary to describe it here.

Inserted into the front end of the can, near its bottom, is a pane of glass or mica, H, and near the bottom of the well F is a similar pane, I, the panes H and I being opposite to each other, with a thin water-space between.

J is the faucet for drawing off the milk and cream from the can, and K is the faucet for drawing off water from the well into which the can is inserted. By removing the milk-faucet J, the can may readily be lifted out of its well. Each can has a flanged cover with rounded corners and a peaked roof, L, the ridge of which is slotted longitudinally, as shown at *l*, which slot or opening is covered by an inverted-V-shaped cap, M, the sides of which are nearly parallel with the roof L, and the lower edges of which approach the upper surface of the cover, leaving a narrow space between the bottom edges of the cap and the top surface of the cover. The steam and odors from the fresh milk will ascend up through the opening *l*, and, condensing on the under side of the cap M, will run down upon the roof L, and off into the water in the sink, so as not to taint the cream and the butter made from it. This construction is clearly shown in Fig. 2.

For cooling purposes either ice or running water may be used. If ice is used, the lid C is closed down after the milk has been strained into the cans, and the sink and its wells packed with ice, and the ventilators D D are opened to permit the current of air passing through them to carry off the steam and odors from the milk; but after this has become chilled the ventilators should be closed to prevent waste of ice. When running water is used, it is fed to each of the wells in any convenient manner, and escapes through an overflow-pipe at the end of the cabinet. After the cream has set, (with ice this will require from four to six hours, while with water it will usually take from ten to twelve hours,) the skim-milk is drawn off into the milk-pail through the faucet J, the sediment or impurities contained in it passing out with it. As the cream reaches the bottom of the can, which can be observed through the translucent panes H and I, the faucet is shut and the cream-receptacle is put under it, when it is again opened and the cream is drawn off from the can.

By the configuration of the sink with its wells the sawdust and other impurities in the ice will collect in the forward inclined end of the wells, from which they are readily removed through the faucet K by "flushing" the sink and wells. There is no waste of ice-space or of water-space, as the case may be; but the best results are obtained in our improved creaming-can with a minimum expenditure of cooling material. By reference to Fig. 2 of the drawings it will be observed that when the cans G are inserted into the tank, with their slanting bottoms extending down into their respective wells F, the triangular caps M of the slotted can-covers L project up above the upper rim of the tank and above the top of the box or casing A, projecting into the flanged cover C transversely across a line connecting the two draft-openings D D, so that cold air passing between these openings, as indicated by the arrows, will cool off the caps M, thereby keeping them at a constant low temperature, and thus expediting the condensation of the vapors which ascend from the body of cream in the can up into the cap of the cover.

We are aware that it is not new to immerse creaming-cans or milk-cans in tanks or vats conforming to the shape of the can or the immersed portion of the can; nor do we claim such construction, broadly; but by the peculiar construction of the tank with its wells, and of the cans, as herein shown and described, we greatly economize the use of ice or ice-water. The tanks and wells may be readily flushed for cleaning, and both the wells and the cans may be inspected through the registering-panes I and H, to ascertain the water-level and cream-level without opening the top or cover of the cabinet.

We are also aware that it has been proposed to construct a refrigerating-cabinet with a tank provided with a series of depending wells and with cans of similar shape, whereby the processes of refrigeration and milk-cooling are carried on simultaneously, and do not claim, broadly, such construction, but limit ourselves to the constructions shown and claimed.

We claim as our improvement and desire to secure by Letters Patent of the United States—

1. The refrigerating box or cabinet A B C, having the tank E, provided with a series of wells, F, and inwardly-sloping portions *e e*, said wells having straight sides, straight fronts provided with translucent panes I, and sloping bottoms *f*, substantially as and for the purpose herein shown and set forth.

2. In a milk-cooler, and in combination with the tank A, a series of wells formed of a single sheet of metal doubled upon itself, whereby the various compartments or wells are formed, the said wells extending the whole width of the metal sheet, and each having a sloping bottom, as set forth.

3. The refrigerating box or cabinet having a tank provided with a series of wells formed of sheet metal doubled upon itself, and having straight fronts and sides and sloping bottoms, in combination with a series of cans having similarly-shaped bottoms and sides, and arranged at a distance from the bottom and sides of the wells, substantially as described.

4. The combination of the refrigerating box or cabinet having a hinged cover provided with draft-openings, the tank provided with a series of wells, and the cans having longitudinally-slotted covers provided with caps overlapping the openings in said covers, so arranged that said caps will project above the tank and intercept a current of air passing between the draft-openings, substantially as and for the purpose herein shown and specified.

5. In a milk-cooler, a series of narrow rectangular cans, each having an inverted-V-shaped cover with an opening in the apex, covered by a similar inverted-V-shaped cap, whose lower edges approach the upper surface of the cover, leaving a narrow space between the bottom edges of the cap and top surface of the cover, substantially as and for the purpose specified.

SAMUEL J. WILSON.
NAHUM T. WILSON.

Witnesses:
A. G. BISHOP,
JNO. H. WILDER.